(12) United States Patent
Gollob et al.

(10) Patent No.: US 7,799,111 B2
(45) Date of Patent: Sep. 21, 2010

(54) THERMAL SPRAY FEEDSTOCK COMPOSITION

(75) Inventors: David S. Gollob, Simsbury, CT (US); Thomas H. Piquette, Avon, CT (US); James Derby, Higganum, CT (US); Omar Basil Al-Sabouni, South Windsor, CT (US); Richard Karl Schmid, Melville, NY (US); Jacobus Cornelis Doesburg, Edmonton (CA)

(73) Assignee: Sulzer Metco Venture LLC, Elmwood, CT (US)

( * ) Notice: Subject to any disclaimer, the term of this patent is extended or adjusted under 35 U.S.C. 154(b) by 1129 days.

(21) Appl. No.: 11/091,879

(22) Filed: Mar. 28, 2005

(65) Prior Publication Data

US 2006/0213326 A1    Sep. 28, 2006

(51) Int. Cl.
C22C 29/00 (2006.01)
C22C 29/02 (2006.01)
C22C 29/04 (2006.01)
C22C 29/06 (2006.01)
C22C 29/14 (2006.01)

(52) U.S. Cl. .............................. 75/230; 75/236; 75/237; 75/238; 75/239; 75/240; 75/241; 75/242; 75/243; 428/446

(58) Field of Classification Search .................. 75/230, 75/236–244; 427/287; 428/446
See application file for complete search history.

(56) References Cited

U.S. PATENT DOCUMENTS

| | | | |
|---|---|---|---|
| 3,019,128 A | 1/1962 | Smiley | |
| 3,086,782 A | 4/1963 | Peickii | |
| 3,095,316 A | 6/1963 | Hartwig | |
| 3,348,929 A | 10/1967 | Valtschev et al. | |
| 3,440,079 A | 4/1969 | Jensen | |
| 3,450,545 A | 6/1969 | Ballard et al. | |
| 3,617,358 A * | 11/1971 | Dittrich | 427/447 |
| 3,655,425 A * | 4/1972 | Longo et al. | 75/230 |
| 3,839,618 A | 10/1974 | Muehlberger | |
| 3,840,350 A | 10/1974 | Tucker, Jr. | |
| 3,909,241 A * | 9/1975 | Cheney et al. | 75/255 |
| 3,920,468 A | 11/1975 | Brown et al. | |
| 4,226,914 A * | 10/1980 | Terner et al. | 428/446 |
| 4,288,495 A | 9/1981 | Terner et al. | |
| 4,485,143 A | 11/1984 | Inoue et al. | |
| 4,627,896 A | 12/1986 | Nazmy et al. | |
| 4,755,220 A | 7/1988 | Woditsch et al. | |
| 4,800,065 A | 1/1989 | Christodoulou et al. | |
| 4,962,069 A | 10/1990 | Burns et al. | |
| 5,017,527 A | 5/1991 | June-Gunn et al. | |
| 5,039,629 A | 8/1991 | Kakligian | |
| 5,049,450 A * | 9/1991 | Dorfman et al. | 428/570 |
| 5,173,367 A | 12/1992 | Liimatta et al. | |
| 5,179,048 A | 1/1993 | Niebylski | |
| 5,236,638 A | 8/1993 | Schulten et al. | |
| 5,302,450 A | 4/1994 | Rao et al. | |
| 5,332,601 A | 7/1994 | Varacalle et al. | |
| 5,358,753 A | 10/1994 | Rao et al. | |
| 5,457,151 A | 10/1995 | Graef et al. | |
| 5,484,662 A | 1/1996 | Rao | |
| 5,506,055 A | 4/1996 | Dorfman et al. | |
| 5,629,091 A | 5/1997 | Rao et al. | |
| 5,640,666 A | 6/1997 | Jayashankar et al. | |
| 5,837,048 A | 11/1998 | Kelly | |
| 5,861,445 A | 1/1999 | Xu et al. | |
| 5,897,921 A | 4/1999 | Borom et al. | |
| 5,932,293 A | 8/1999 | Belashchenko et al. | |
| 6,110,268 A | 8/2000 | Gross et al. | |
| 6,340,497 B2 | 1/2002 | Wilson et al. | |
| 6,365,274 B1 * | 4/2002 | Scheckenbach et al. | 428/402 |
| 6,436,480 B1 | 8/2002 | Upadhya | |
| 6,491,971 B2 | 12/2002 | Costantini et al. | |
| 6,610,370 B2 | 8/2003 | Wang et al. | |
| 2002/0058576 A1 | 5/2002 | Mazany et al. | |
| 2003/0003328 A1 | 1/2003 | Spitsberg et al. | |
| 2003/0003329 A1 | 1/2003 | Wang et al. | |
| 2003/0159619 A1 | 8/2003 | Noguchi et al. | |
| 2003/0180565 A1 | 9/2003 | Herbst-Dederichs | |
| 2003/0190413 A1 | 10/2003 | Van Steenkiste et al. | |
| 2003/0198749 A1 | 10/2003 | Kumar et al. | |
| 2003/0207142 A1 | 11/2003 | Giesler et al. | |
| 2004/0071896 A1 | 4/2004 | Kang et al. | |
| 2004/0151840 A1 | 8/2004 | Wang et al. | |

(Continued)

FOREIGN PATENT DOCUMENTS

BE    510038    4/1952

(Continued)

OTHER PUBLICATIONS

Christopher C. Berndt, "Materials production for thermal spray processs" Aug. 1992.*

(Continued)

*Primary Examiner*—Jerry Lorengo
*Assistant Examiner*—Shuangyi Abu Ali
(74) *Attorney, Agent, or Firm*—Florek & Endres PLLC

(57) ABSTRACT

The invention relates to a thermal spray feedstock composition that employs free flowing agglomerates formed from (a) a ceramic component that sublimes, (b) a metallic or semiconductor material that does not sublime and (c) a binder. The invention also relates to a method for preparing the agglomerates and a method for preparing ceramic containing composite structures from the agglomerates.

29 Claims, No Drawings

U.S. PATENT DOCUMENTS

| | | |
|---|---|---|
| 2004/0173948 A1 | 9/2004 | Pandelisev |
| 2004/0258916 A1 | 12/2004 | Tului et al. |
| 2006/0213326 A1 | 9/2006 | Gollob et al. |

FOREIGN PATENT DOCUMENTS

| | | |
|---|---|---|
| DE | 2028050 | 12/1971 |
| DE | 3721008 | 10/1988 |
| DE | 10324713 | 12/2004 |
| EP | 0005632 | 11/1979 |
| EP | 0166676 | 2/1986 |
| EP | 0232919 | 8/1987 |
| EP | 0459114 | 12/1991 |
| EP | 0771884 | 5/1997 |
| EP | 1126043 | 8/2001 |
| EP | 1518622 | 3/2005 |
| EP | 1792677 | 6/2007 |
| FR | 2575185 | 6/1986 |
| GB | 1263859 | 2/1972 |
| JP | 59064766 | 4/1984 |
| JP | 60089557 | 5/1985 |
| JP | 60103169 | 6/1985 |
| JP | 63-218272 | 9/1988 |
| JP | 10088311 | 4/1998 |
| JP | 2005015874 | 1/2005 |
| WO | WO9616918 | 6/1996 |
| WO | WO01/12431 A1 * | 2/2001 |
| WO | WO2006104737 | 5/2006 |
| WO | WO2007108793 | 9/2007 |

OTHER PUBLICATIONS

Wielage, et al., Manufacture of SiC Composite Coating by HVOF, Thermal Spray 2001: New Surfaces for a New Millennium, (Ed.) C.C. Berndt, K.A. Khor, and E.F. Lugscheider, Published by ASM International, Materials Park, Ohio, USA, 2001.

International Search Report and Written Opinion for PCT/US2006/009912.

International Search Report and Written Opinion for PCT/US2006/009962.

International Search Report and Written Opinion for PCT/US07/08442.

* cited by examiner

THERMAL SPRAY FEEDSTOCK COMPOSITION

The present invention relates to (i) a composition that is useful as a feedstock for a thermal spray apparatus, (ii) a method for making the feedstock for a thermal spray apparatus and (iii) a method for preparing structures from the feedstock using a thermal spray apparatus. The feedstock is particularly useful in creating ceramic containing composite coatings and free standing structures.

BACKGROUND OF THE INVENTION

Ceramic containing composite materials have been known for many years and have been the subject of extensive research due to their unique combinations of chemical, electrical, mechanical and thermal properties. For example metal matrix ceramic containing coatings have been widely used in gas turbine engines. Other ceramic based coatings are used in the semi-conductor industry. These coatings are often applied by depositing the ceramic containing composites onto the substrate using methods such as physical vapor deposition (PVD), chemical vapor deposition (CVD), thermal or kinetic spray techniques. See generally U.S. Pat. No. 4,288,495 and U.S. Published patent application No. 2003/0180565. These prior art methods for depositing a ceramic containing composite coating often require a large amount of time to deposit a small amount of material or are very expensive and require complex processing conditions.

Ceramic containing composites have also been used to make structures such as piston rings or honeycomb structures for use in exhaust gas purification apparatus. These ceramic containing composites are often made by forming a "green body" and subjecting the green body to hot air drying and firing. See generally U.S. Published patent application No. US 2003/0159619.

In addition, to CVD, silicon carbide structures are produced primarily by sintering or reaction bonded processes.

Sintered silicon carbide components are traditionally manufactured using a mixture of silicon carbide particles, a sintering aid such as boron or aluminum, and binders. The binders enable the powder to be poured and pressed into a mold to form a green body with adequate strength to allow handling. A low temperature heating cycle is used for slow burn out of the binder, and to protect against cracking of the green body. The piece is then put into a high temperature furnace where sintering occurs. Presence of the sintering aid causes the silicon carbide body to shrink (about 20%) at a temperature of approximately 2100° C., without use of external pressure. The final sintered structure is relatively free of porosity.

Reaction bonded silicon carbide components consist of silicon carbide particles and free silicon. Traditional manufacturing technology uses a powder mixture of silicon carbide particles, binders and possibly graphite particles which are pressed at high pressure into a shape to form a green body of relatively high density. The body is placed in a low temperature furnace for a drying and binder burn out. The body is then placed into a graphite container with granular silicon. The container is covered and placed into a furnace, which is heated to about 1600° C. Under these conditions, the silicon vaporises and wicks into the body to form a reaction bonded silicon carbide structure relatively free of porosity. Unlike sintered SiC, reaction bonded silicon carbide components do not shrink during manufacturing.

As with the ceramic containing coatings discussed earlier, ceramic containing structures are expensive and difficult to manufacture because of the large amount of time, energy and high capital investment necessary to convert the starting materials into a final product.

It is an object of the present invention to provide a thermal spray feedstock that can be used to prepare ceramic containing composite materials, i.e. coatings or free-standing structures.

It is a further object of the present invention to provide a method for preparing a feedstock for conventional thermal spray apparatus which can be used to produce a ceramic containing composite material, i.e. coating or free-standing structure, in a quick, efficient and simple manner.

It is still a further object of the present invention to provide a method for quickly and efficiently preparing ceramic containing composite materials, i.e. coatings or free-standing structures, using conventional thermal spray apparatus.

SUMMARY OF THE INVENTION

The above-identified objects and other objects of the present invention are achieved by a composition of matter comprising agglomerates containing ceramic particles. More specifically, the agglomerates comprise at least one type of ceramic that sublimes, at least one type of material, typically a metal or semi-conductor, that does not sublime, and a binder. The agglomerates may also contain other components depending upon the properties or use desired for the final product. The agglomerates can be any shape such as spherical, cylindrical, angular, irregular or combinations of the foregoing. The size distribution of the agglomerates will vary depending upon the type of thermal spray apparatus employed. It is important that the agglomerates form a free flowing composition that can be fed into a thermal spray apparatus. For example, a free flowing material can be established according to ASTM B213-03, which is incorporated herein by reference.

The particle size of the components of the agglomerates, i.e the ceramic that sublimes, the metallic or semi-conductor material that does not sublime, and the binder, should be smaller than the average particle size of the agglomerates.

The agglomerates can be formed by mixing the ceramic that sublimes, the metallic or semi-conductor material that does not sublime, the binder, and any other desired component with or without a granulation fluid or liquid to form free flowing agglomerates. If a granulation fluid is employed, the granulation fluid may be water, an organic solvent or a combination of water and an organic solvent. The granulation fluid should be removed during or after the formation of the agglomerate, however, limited or residual amounts may remain in the agglomerates.

The agglomerate can also be formed by dry methods such as by compression of the ceramic that sublimes, the metallic or semi-conductor material that does not sublime, the binder and any other desired component followed by subsequent milling or sieving step to break the compressed mass into smaller free flowing agglomerates.

Once the free flowing agglomerates are formed, they can be fed into a thermal spray apparatus and sprayed onto a substrate to form a coating or structural deposit. In one embodiment, the agglomerates are sprayed onto the desired substrate in a controlled atmosphere, preferably but not necessarily an oxygen free atmosphere, such as a nitrogen or argon rich atmosphere. The resulting structure exhibits a relatively uniform or homogeneous distribution of the ceramic that sublimes and the metallic or semi-conductor material that does not sublime.

Because the present invention allows ceramic containing composite structures to be prepared fairly quickly and easily compared to the prior art, the present invention has the added advantage of being able to quickly and easily vary the composition of the final structure. For example, by spraying separate and distinct agglomerate compositions at different times wherein each separate and distinct agglomerate composition has a unique amount of ceramic or other component, a structure with varying layers of ceramic can be obtained. Such a multi-laminar structure is particularly useful for coatings and materials that require varying mechanical or physical properties within the same structure.

DETAILED DESCRIPTION OF THE INVENTION

The ceramic component of the agglomerates can comprise particles having a mono-modal or multi-modal size distribution that is smaller than the average size distribution of the agglomerate. Typical ceramic particle sizes range from about 0.1 μm to about 200 μm, preferably about 1 μm to about 100 μm. Some of the preferred ceramics are carbides, borides, nitrides or combinations of the foregoing, many of which sublime. Some specific examples of the ceramics that sublime include silicon carbide, zirconium boride, niobium boride, silicon nitride, boron nitride, aluminum nitride and tantalum nitride.

The preferred ceramic is silicon carbide (SiC). Some of the suppliers of the SiC are HC Stark, Superior Graphite, and Panadyne, Inc. Other ceramics are known to individuals of ordinary skill in the art such as those described in U.S. Pat. No. 6,436,480 and U.S. Published patent application Nos. 2003/0159619 and 2003/0180565 which are incorporated herein by reference.

Like the ceramic component discussed above, the metallic or semi-conductor material that does not sublime, (sometimes referred to in the art as a matrix phase or metal matrix phase) can comprise mono-modal or multi-modal particles having a size distribution smaller than the average particle size of the agglomerate. The metallic or semi-conductor material component can be silicon, aluminum, boron, beryllium, zirconium, hafnium, titanium, cobalt, nickel, tungsten, vanadium, niobium, tantalum, iron, chromium or combinations of the foregoing.

The preferred material that does not sublime is silicon or tungsten. Some commercial suppliers of silicon are Atlantic Equipment Engineers, Panadyne, Inc. and STI. It is desired that the material component will plastify or liquefy, but not sublime, during the thermal spraying process.

The binder component of the agglomerates can be any type of binder commonly known in the industry. The binder can be any material that aids in the formation of the agglomerates. Some well known binders are polyvinyl pyrrolidone, hydroxyethylcellulose, hydroxypropyl cellulose, hydroxypropyl methycellulose, polymethacrylate, polyvinyl acetate, methylcellulose, carbonyl methylcellulose, ethylcellulose, microcrystalline cellulose, gums, starches, sugars, latex, waxes, or combinations of the foregoing. It is preferred that the binder contain carbon or silicon and that the binder be water soluble or a wax. Examples of the preferred binders are corn syrup available under the tradename KARO™ from Sysco, or carbon methylcellulose (CMC) available under the tradename METHOCEL A4C from DOW chemical.

Depending upon the final product desired, additional components may be incorporated into the agglomerates. The additional components, like the aforementioned components, can comprise mono-modal or multi-modal particles having a size distribution smaller than the average particle size of the agglomerate. One of the possible additional components can be an insoluble carbon such as anthracite, carbon black, graphite, carbon nanotubes, buckminsterfullerines or combinations of the forgoing. Other additional components can be lubricants, glidants, flow aids, dispersants, surfactants or anti-foaming agents, which will be discussed below. Other additional components may be other types of ceramic or matrix phase so as to modify the properties of the desired composite structure. Other examples of possible additives to the agglomerates are solid lubricant particles such as graphite, agents which form pores in the final ceramic composite structure, or materials that will enhance the tribological properties of the final ceramic composite structure. Alternatively, the solid lubricant, pore forming material or the tribological additives may be incorporated into the substrate onto which the ceramic containing agglomerates are sprayed as discussed below.

The amounts of the individual components in the agglomerates can be varied depending upon the desired use of the final ceramic containing composite structure. Typically the agglomerates will comprise about 20-99 weight percent of the ceramic component, preferably 30-97 weight percent and most preferably about 50-95 weight percent of the agglomerates. The agglomerates also typically can comprise about 15 weight percent or less of the binder, preferably about 10 weight percent or less of the binder and most preferably about 5 weight percent or less of the binder. The balance of the agglomerate comprises the metallic or semi-conductor materials that do not sublime and any other additives. Typically the metallic or semi-conductor material comprises about 65 weight percent or less, preferably about 35 weight percent of less and most preferably about 20 weight percent or less.

The agglomerates can be made by any technique commonly known in the industry such as wet granulation techniques or dry granulation techniques. If a wet granulation technique is employed the granulation fluid for forming the wet mass may be water, an organic solvent or a combination of water and an organic. The granulation fluid should be capable of dispersing the individual components of the agglomerates. A dispersant or surfactant may be employed in the wet granulation techniques to aid in the dispersion of the individual components of the agglomerates. An anti-foaming agent may also be employed during the wet granulation to prevent the creation of foam or bubbles during the mixing of the individual components with the granulation fluid.

In one embodiment of the present invention, the four main components of the agglomerate forming process, 1) the liquid; 2) the ceramic component that sublimes; 3) the metallic or semi-conductor material that does not sublime; and 4) the binder are mixed together to form a slurry or paste. The slurry or paste is then dried. Depending upon the consistency and/or viscosity of the slurry or paste, the mixture of the four main components can be dried by any number of methods. For example, if the slurry has a viscosity that allows it to be pumped, the slurry can be spray dried by spraying the slurry into a chamber and drying the sprayed slurry with the use of a drying gas such as air. A number of variations on the spray drying process are well known in the art and may also be used in the present invention. Examples of spray driers that can be used in the present invention include but are not limited to a Niro brand bottom spray drier or an APV model PSD52.

A second method for drying involves placing the slurry or paste into a cladding bowl and mixing and drying the slurry or paste into a powder. Another method for drying involves casting the slurry or paste into a suitable container and drying in air, nitrogen, inert gas or vacuum to form a dried cake. The dried cake is then formed into powder using a suitable benefaction technique such as grinding or milling to achieve a powder with even dispersion of the individual components with the desired size distribution.

The size distribution of the agglomerates is not critical to the present invention as long as the agglomerates are free flowing and can be fed into a thermal spray apparatus. Experiments on the agglomerates have typically involved agglomerates that range in average size of about 1000 microns or less, preferably about 750 microns or less, and most preferably about 600 microns or less.

Another acceptable method for forming the agglomerates of the present invention involves the use of a fluidized bed. Typically the ceramic particles are placed into the product bowl of a fluidized bed. A solution, suspension or dispersion of the metallic or semi-conductor material that does not sublime, the binder and the granulation fluid are mixed together and sprayed into the fluidized bed to form the agglomerates. It is also possible to place the metallic or semi-conductor material that does not sublime into the product bowl of the fluidized bed and spray a solution, suspension or dispersion containing the ceramic component, binder and granulation fluid into the fluidized bed.

If a dry granulation technique is employed to create the agglomerates of the present invention, the individual components of the agglomerates are mixed together and compacted using a common press such as a roller compactor. Once the dry compressed mass is obtained it can be ground, milled or sieved to break the compressed mass into free flowing agglomerates.

It is also possible to form the agglomerates by selecting a wax or other binder material that has a low melting point, such as below 200° C., preferably below 100° C. The low melting binder material can be mixed with the other agglomerate components and the resulting mixture can than be heated and cooled to produce the agglomerates. The low melting binder can also be heated prior to the addition of the other agglomerate components then cooled to form the agglomerates. This heating and mixing can be accomplished with an extruder.

Regardless of the method employed to prepare the granules, it may be desirable to size the agglomerates prior to feeding them into a thermal spray apparatus. The sizing can be performed using conventional techniques such as screening, air classification or tabling and jigging. It may also be desirable to add a lubricant, glidant or flow aid to the agglomerates such as talc, magnesium stearate or silicon dioxide to aid in obtaining a free flowing agglomerate and/or feeding the free flowing agglomerates into the thermal spray apparatus.

Once the free flowing agglomerates are prepared they can be fed into a thermal spray apparatus for creation of a ceramic containing composite structure such as a coating or structural deposit. A preferred thermal spray apparatus is a plasma spray apparatus using a high energy (greater than 100 kW) plasma gun with high gas flows. Examples of some plasma spray guns that can be used with the present invention include Axial III available from Northwest Mettech, Triplex II available from Sulzer Metco, 03CP available from Sulzer Metco and F4 available form Sultzer Metco. Other types of thermal spray apparatus can be used provided they can produce the necessary heat and velocity to form the desired structure. The other thermal processes that can be used with the present invention include Air Plasma Spray (APS), Vacuum Plasma Spray (VPS), Low Pressure Plasma Spray (LPPS), radio frequency plasma, plasma transfer arc, microwave, high velocity oxy-fuel (HVOF), high velocity air fuel (HVAF), high velocity liquid fuel (HVLF), combustion, induction or laser. All of the afore-mentioned methods are included within the term "thermal spray" as used in this specification.

In an embodiment of the present invention, a plasma gas stream is formed using a DC plasma gun. The plasma forming gas is typically a mixture of nitrogen and hydrogen, but may also include argon, helium, carbon dioxide or mixtures of the foregoing. Additionally a reactive gas, for instance a hydrocarbon gas such as methane, propane or butane may be introduced as part of the plasma forming gases or injected downstream of the plasma forming stage.

A gas stream with sufficient kinetic and thermal energy to heat and accelerate the feedstock agglomerates toward a substrate may also be produced via a combustion thermal spray process such as flame spray or HVOF. In processes of this type, the working gases would consist of any combustible gas or liquid and oxygen. Reactive gases or liquids may also be introduced into the combustion process.

Although not necessary, to enhance the formation of the ceramic containing composite structure and control any undesired side reactions that may occur during the formation of the ceramic containing composite structure, it may be desirable to perform the spraying in a controlled atmosphere. This can be done by the use of an inert shroud gas to isolate the carrier media, such as the plasma plume, with entrained particles from the surrounding environment or carry out the spray process inside a chamber that contains a primarily oxygen free environment with pressures that can vary from 1 mbar to pressures above atmospheric.

When spraying the agglomerates, the agglomerates are suspended in a carrier gas that is injected into a high energy gas stream effluent. The carrier gas may be an inert gas or a reactive gas as discussed above. It is preferred that the agglomerates be injected axially into the high energy gas stream to provide a more uniform temperature and acceleration profile, however, the agglomerates may also be injected radially depending on the thermal spray process and/or gun manufacturer. The agglomerates may be injected both internally or externally of the gun body depending again on the thermal spray process and/or gun manufacturer. The rate at which the agglomerates are injected also depends again on the thermal spray process and/or gun manufacturer; however, typical rates have been about 20 g/min to about 200 g/min per injection point.

A solid deposit or coating is produced when the agglomerates in the particle stream of the thermal spray apparatus coalesce on impact with a substrate or previously solidified particles. Movement of the substrate relative to the thermal spray gun determines deposition thickness and ultimately the shape and dimensions of the final structure, or coating.

Simple near net shapes can be produced by various means, for example spraying onto a surface, which is either rotated about an axis parallel or perpendicular to the axis of the particle stream. More complex shapes can be produced by using different mold designs.

Composite near net shapes or coatings can also be formed by spraying onto reinforcing fiber, matte or similar material. The reinforcing material can be, for example, ceramic or graphite fibers, filaments, matte, wiskers or combinations of the foregoing. Alternately, reinforcing material can be introduced during spraying.

Additionally, the substrate or mold may be subsequently removed either chemically or mechanically allowing the formation of free-standing composites or shapes including, but not limited to sheets, billets and tubes.

The substrate onto which the agglomerates are sprayed may be pretreated mechanically, thermally or chemically prior to the application of ceramic containing composite. The pretreatment may involve preheating, precleaning or precoating. The precoating could act as a release agent that diminishes the resulting bond between the sprayed material and the substrate. The precoating could also be an adhesive that increases the resulting bond between the sprayed material and the substrate or that acts in a manner to compensate for differences in the thermal coefficients of expansion between the substrate and sprayed material. In some cases, it may be possible to dope the substrate as a method of altering the properties of the spray formed deposit.

It may also be possible to spray a first layer of ceramic containing composite onto the substrate which employs a composition that will enhance or diminish the resulting bond with the substrate, then apply one or more additional layers of a sprayed material onto the first layer wherein the one or more layers have a different composition than the first layer. This multiple layer arrangement can be easily accomplished with the present invention by merely preparing two or more groups of agglomerates with different compositions and serially or simultaneously feeding the agglomerates with different compositions into the thermal spray apparatus.

It is also within the scope of the present invention to prepare a plurality of feedstock agglomerates with well known or defined ratios of ceramic components that sublime, metallic or semi-conductor materials that do not sublime and binder. Two or more of the predefined feedstock agglomerates may then be mixed together prior to thermal spraying to obtain a resulting structure with the desired final composition and properties.

Once the sprayed ceramic composite structure is formed, post processing steps can be performed on the resulting structure. The post processing steps include but are not limited to, laser etching of the surface for cosmetic or functional purposes; laser cladding to add a top layer of material for cosmetic or functional purposes; annealing at elevated temperatures to relieve internal stress and/or further affecting the sprayed formation; grinding, lapping and polishing or cutting the surface for cosmetic or functional purposes or to bring dimensions into required tolerance.

The present invention will be described in detail by reference to the following examples that are provided for illustrative purposes. The following examples should not be construed as limiting the invention. Many variations that do not depart from the spirit or scope of the present invention will suggest themselves to those skilled in the art. All such obvious modifications are within the intended scope of the invention.

EXAMPLE 1

Mono-modal SiC and Mono-modal Si

A thermal spray feedstock agglomerate composition was prepared with the following composition:

| COMPONENT | WEIGHT PERCENT |
|---|---|
| Mono-modal SiC | 72.1% |
| Mono-modal Si | 24.1% |
| Corn syrup (solids) | 3.8% |

The above described thermal spray feedstock agglomerate was prepared by mixing about 18000 g of mono-modal SiC exhibiting an average particle size of about 1 µm, about 6000 g of mono-modal Si exhibiting an average particle size of about 25 µm, 950 g (solids) of corn syrup.

The afore-mentioned components were mixed with water to form a slurry. The slurry was then spray dried using a commercial spray drier. The resulting agglomerates were free flowing, and had an average particle size of about 6511m.

EXAMPLE 2

Tri-modal SiC and Bi-modal Si

A thermal spray feedstock agglomerate composition is prepared with the following composition:

| COMPONENT | WEIGHT PERCENT |
|---|---|
| Tri-modal SiC | 72.6% |
| Bi-modal Si | 18.2% |
| Corn syrup (solids) | 3.6% |
| Carbon Methyl Cellulose (CMC) | 1.1% |
| Carbon Black | 4.5% |

The above described thermal spray feedstock agglomerate is prepared by mixing about 5760 g of tri-modal SiC, about 1440 g of bi-modal Si, about 285 g (solids) of corn syrup, about 90 g of commercially available CMC and about 360 g of commercially available carbon black. The tri-modal SiC component contains about 30-40 weight % based upon the total weight of the agglomerate composition of about 20 µm SiC, about 25-35 weight % based upon the total weight of the agglomerate composition of about 6 µm SiC and about 5-15 weight percent based upon the total weight of the agglomerate composition of about 1 µm SiC. The bi-modal Si component contains about 1-10 weight % based upon the total weight of the agglomerate composition of about 25 µm Si and about 10-20 weight % based upon the total weight of the agglomerate composition of about 6 µm Si.

The afore-mentioned components are mixed with water to form a slurry. The slurry is poured into pans and baked in an oven, forming a cake. The cake material was mechanically crushed and screened to form a powder. The average particle size of the agglomerates is about 50-95 µm.

EXAMPLE 3

Tri-modal SiC and Bi-modal Si

A thermal spray feedstock agglomerate composition is prepared with the following composition:

| COMPONENT | WEIGHT PERCENT |
|---|---|
| Tri-modal SiC | 75% |
| Bi-modal Si | 17% |
| Corn syrup | 3% |
| Carbon Methyl Cellulose (CMC) | 1% |
| Nopcosperse | 1% |
| Carbon Black | 3% |

The above described thermal spray feedstock agglomerate is prepared by mixing about 22083 g of tri-modal SiC, about 5241 g of bi-modal Si, about 200 g of commercially available CMC, about 864 g (solids) of commercially available corn syrup, about 200 g of nopcosperse dispersant and about 874 g of commercially available carbon black. The afore-mentioned components are mixed with water to form a slurry. The tri-modal SiC component contains about 3545 weight % based upon the total weight of the agglomerate composition of about 20 µm SiC, about 30-40 weight % based upon the total weight of the agglomerate composition of about 6 μm SiC and about 5-15 weight % based upon the total weight of the agglomerate composition of about 1 μm SiC. The bi-modal Si component contains about 1-10 weight % based upon the total weight of the agglomerate composition of about 25 μm Si and about 1-10 weight % based upon the total weight of the agglomerate composition of about 6 μm Si.

The slurry is then spray dried using a commercial spray drier. The resulting agglomerates are free flowing and have an average particle size of 50-100 μm.

EXAMPLE 4

Tri-modal SiC and Bi-modal Si

A thermal spray feedstock agglomerate composition was prepared with the following composition:

| COMPONENT | WEIGHT PERCENT |
|---|---|
| Tri-modal SiC | 75.9% |
| Bi-modal Si | 17.4% |
| Carbon Methyl Cellulose (CMC) | 2.2% |
| Carbon Black | 4.5% |

The above described thermal spray feedstock agglomerate was prepared by mixing about 7671 g of tri-modal SiC, about 1760 g of bi-modal Si, about 228 g of commercially available CMC, and 455 g of commercially available carbon black. The tri-modal SiC component contained about 38.2 weight % based upon the total weight of the agglomerate composition of about 20 μm SiC, about 30.6 weight % based upon the total weight of the agglomerate composition of about 6 μm SiC and about 7.1 weight % based upon the total weight of the agglomerate composition of about 1 μm SiC. The bi-modal Si component contained about 3.6 weight % based upon the total weight of the agglomerate composition of about 13.8 μm Si and about 1-10 weight % based upon the total weight of the agglomerate composition of about 6 μm Si.

The afore-mentioned components were mixed with water to form a slurry. The slurry was then spray dried using a commercial spray drier. The resulting agglomerates are free flowing and have an average particle size of about 85 μm.

EXAMPLE 5

Tri-modal SiC and Bi-modal Si

A thermal spray feedstock agglomerate composition is prepared with the following composition:

| COMPONENT | WEIGHT PERCENT |
|---|---|
| Tri-modal SiC | 82.6% |
| Bi-modal Si | 15.0% |
| Carbon Methyl Cellulose (CMC) | 2.4% |

The above described thermal spray feedstock agglomerate is prepared by mixing about 33022 g of tri-modal SiC, about 6000 g of bi-modal Si and 978 g of commercially available CMC. The tri-modal SiC component contains about 37-47 weight % based upon the total weight of the agglomerate composition of about 20 μm SiC, about 30-40 weight % based upon the total weight of the agglomerate composition of about 6 μm SiC and about 5-15 weight % based upon the total weight of the agglomerate composition of about 1 μm SiC. The bi-modal Si component contains about 1-14 weight % based upon the total weight of the agglomerate composition of about 25 μm Si and about 1-14 weight % based upon the total weight of the agglomerate composition of about 6 μm Si.

The slurry is then spray dried using a commercial spray drier. The resulting agglomerates are free flowing and have an average particle size of 50-100 μm.

EXAMPLE 6

Mono-modal SiC and Mono-modal Si

A thermal spray feedstock agglomerate composition was prepared with the following composition:

| COMPONENT | WEIGHT PERCENT |
|---|---|
| Mono-modal SiC | 81.8% |
| Mono-modal Si | 14.4% |
| Corn syrup (solids) | 3.8% |

The above described thermal spray feedstock agglomerate was prepared by mixing about 14,280 g of mono-modal SiC exhibiting an average particle size of about 1 μm, about 2520 g of mono-modal Si exhibiting an average particle size of about 1 μm, about 665 g (solids) of corn syrup.

The afore-mentioned components were mixed with water to form a slurry. The slurry was then spray dried using a commercial spray drier. The resulting agglomerates were free flowing, and had an average particle size of about 70 μm.

EXAMPLE 7

The agglomerates prepared in Example 1 were axially injected into Plasma Spray apparatus. The plasma forming gas was a mixture of Nitrogen, Hydrogen and Argon. The plasma spray was directed onto a graphite substrate rotating about an axis parallel to the spray direction that was in an inert chamber containing Nitrogen gas at ambient pressure.

The resulting deposit was cut using a diamond saw, and was mounted and polished for microstructural evaluation. Examination of the coating microstructure showed Silicon Carbide particles closely packed and evenly distributed within a Silicon matrix.

EXAMPLE 8

The agglomerates prepared in Example 2 are axially injected into a Plasma Spray apparatus. The plasma forming gas is a mixture of Nitrogen, Hydrogen, and Argon. The plasma spray is directed onto a graphite substrate rotating about an axis parallel to the spray direction that is in an inert chamber containing Nitrogen gas at ambient pressure.

The resulting deposit is cut using a diamond saw, and is mounted and polished for microstructural evaluation. Examination of the coating microstructure shows Silicon Carbide particles closely packed and evenly distributed within a Silicon matrix.

EXAMPLE 9

The agglomerates prepared in Example 3 are axially fed into Plasma Spray apparatus. The plasma forming gas is a mixture of Nitrogen, Hydrogen and Argon. The plasma spray is directed onto a graphite substrate rotating about an axis parallel to the spray direction that is in an inert chamber containing Nitrogen gas at ambient pressure.

The resulting deposit is cut using a diamond saw, and is mounted and polished for microstructural evaluation. Examination of the coating microstructure shows Silicon Carbide particles closely packed and evenly distributed within a Silicon matrix. Typical Vickers microhardness measurements of the Silicon Carbide particles are about 2600.

EXAMPLE 10

The agglomerates prepared in Example 3 are radially fed into the stream from a Plasma Spray gun within a low pressure (1.5 mbar) chamber. The plasma forming gas is an Argon-Hydrogen mixture. The plasma spray is directed onto a steel bond strength testing specimens. The tensile bond strength is found to exceed 11,000 PSI. Examination of the coating microstructure showed finely layered Silicon Carbide particles closely packed and evenly distributed within a silicon matrix.

EXAMPLE 11

The agglomerates prepared in Example 4 were axially fed into a Plasma Spray apparatus. The plasma forming gas was a mixture of Nitrogen and Hydrogen. The plasma spray was directed onto a graphite substrate rotating about an axis parallel to the spray direction that was in an inert chamber containing Argon gas at ambient pressure.

The resulting deposit was cut using a diamond saw, and was mounted and polished for microstructural evaluation. Examination of the coating microstructure showed Silicon Carbide particles closely packed and evenly distributed within a Silicon matrix.

EXAMPLE 12

The agglomerates prepared in Example 5 are axially fed into a Plasma Spray apparatus. The plasma forming gas is a mixture of Nitrogen and Hydrogen. The plasma spray is directed onto a graphite shaft rotating about an axis perpendicular to the spray in a chamber containing Argon gas at ambient pressure. After 6 minutes of spraying, a deposit approximately 6 mm thick and 50 mm long is formed on the graphite shaft. A free standing tube is then produced by removing the graphite substrate.

The resulting deposit is cut using a diamond saw, and is mounted and polished for microstructural evaluation. Examination of the coating microstructure shows Silicon Carbide particles closely packed and evenly distributed within a Silicon matrix.

We claim:

1. A thermal spray feedstock composition comprising free flowing agglomerates wherein the agglomerates comprise (a) 30 to about 97 weight percent silicon carbide with an average particle size of about 20 µm or less, (b) silicon with an average particle size of 25 µm or less and (c) a carbon containing binder.

2. The thermal spray feedstock composition as defined in claim 1 wherein the particle size of the silicon carbide is mono-modal.

3. The thermal spray feedstock composition as defined in claim 1 wherein the particle size of the silicon carbide is multi-modal.

4. The thermal spray feedstock composition as defined in claim 1 wherein the particle size distribution of the silicon is mono-modal.

5. The thermal spray feedstock composition as defined in claim 1 wherein the particle size distribution of the silicon is multi-modal.

6. The thermal spray feedstock composition as defined in claim 1 wherein the binder is selected from the group consisting of polyvinyl pyrrolidone, hydroxyethylcellulose, hydroxypropyl cellulose, hydroxypropyl methylcellulose, polymethacrylate, methylcellulose, ethylcellulose, microcrystalline cellulose, gums, starches, sugars, waxes, or combinations of the foregoing.

7. The thermal spray feedstock composition as defined in claim 6 wherein the binder is selected from the group consisting of hydroxypropyl cellulose, hydroxypropyl methylcellulose, methylcellulose or combinations of the foregoing.

8. The thermal spray feedstock composition as defined in claim 7 wherein the binder is a starch, sugar, wax or combination of the foregoing.

9. The thermal spray feedstock composition as defined in claim 1 wherein the binder is water soluble.

10. The thermal spray composition as defined in claim 1 further comprising additional components selected from the group consisting of insoluble carbon, a lubricant, a glidant, a flow aid, a surfactant, a dispersant, an anti-foaming agent or combinations of the forgoing.

11. The thermal spray feedstock composition as defined in claim 1 wherein the silicon carbide comprises about 50 to about 95 weight percent of the agglomerate.

12. The thermal spray feedstock composition as defined in claim 1 wherein the silicon comprises about 65 weight percent or less of the agglomerate.

13. The thermal spray feedstock composition as defined in claim 12 wherein the silicon comprises about 35 weight percent or less of the agglomerate.

14. The thermal spray feedstock composition as defined in claim 13 wherein the silicon comprises about 20 weight percent or less of the agglomerate.

15. The thermal spray feedstock composition as defined in claim 1 wherein the binder comprises about 15 weight percent or less of the agglomerate.

16. The thermal spray feedstock composition as defined in claim 15 wherein the binder comprises about 10 weight percent or less of the agglomerate.

17. The thermal spray feedstock composition as defined in claim 16 wherein the binder comprises about 5 weight percent or less of the agglomerate.

18. The thermal spray feedstock composition as defined in claim 1 wherein the agglomerates have an average particle size of about 1000 microns or less.

19. The thermal spray feedstock composition as defined in claim 18 wherein the agglomerates have an average particle size of about 750 microns or less.

20. The thermal spray feedstock composition as defined in claim 19 wherein the agglomerates have an average particle size of about 600 microns or less.

21. The thermal spray feedstock composition as defined in claim 1 wherein the agglomerates have an average particle size of 50-100 µm.

22. A thermal spray feedstock composition comprising free flowing agglomerates wherein the agglomerates have an average particle size of 50-100 µm and comprise (a) 30 to about 97 weight percent silicon carbide based on the total weight of the agglomerate wherein the silicon carbide has a particle size of about 20 microns or less (b) about 35 weight percent or less of silicon based upon the total weight of the agglomerate wherein the silicon has a particle size of about 25

μm or less and (c) about 10 weight percent of less based upon the total weight of the agglomerate of a carbon containing binder.

23. A method for preparing the free flowing agglomerates as defined in claim 1 comprising the steps of mixing the silicon carbide, silicon and carbon binder with a granulation fluid and drying the mixture to form the agglomerates.

24. A method for preparing the free flowing agglomerates as defined in claim 23 wherein the drying comprises spray drying.

25. A method for preparing the free flowing agglomerates as defined in claim 23 wherein the drying comprises placing the mixture into a cladding bowl.

26. A method for preparing the free flowing agglomerates as defined in claim 1 comprising the steps of mixing the silicon carbide, silicon and carbon binder, compressing the mixture and milling or grinding the compressed mixture to form the free flowing agglomerates.

27. A method for preparing a ceramic composite structure comprising the steps feeding the free flowing agglomerates of claim 1 into a thermal spray apparatus and spraying the free flowing agglomerates onto a substrate.

28. The method as defined in claim 27 wherein the composite structure is a coating on the substrate.

29. The method as defined in claim 27 wherein the composite structure is a free standing structure.

\* \* \* \* \*